Nov. 18, 1924.　　　　J. WAGNER, JR　　　　1,515,636
METAL CUTTING TOOL
Filed May 2, 1923　　　　2 Sheets-Sheet 2

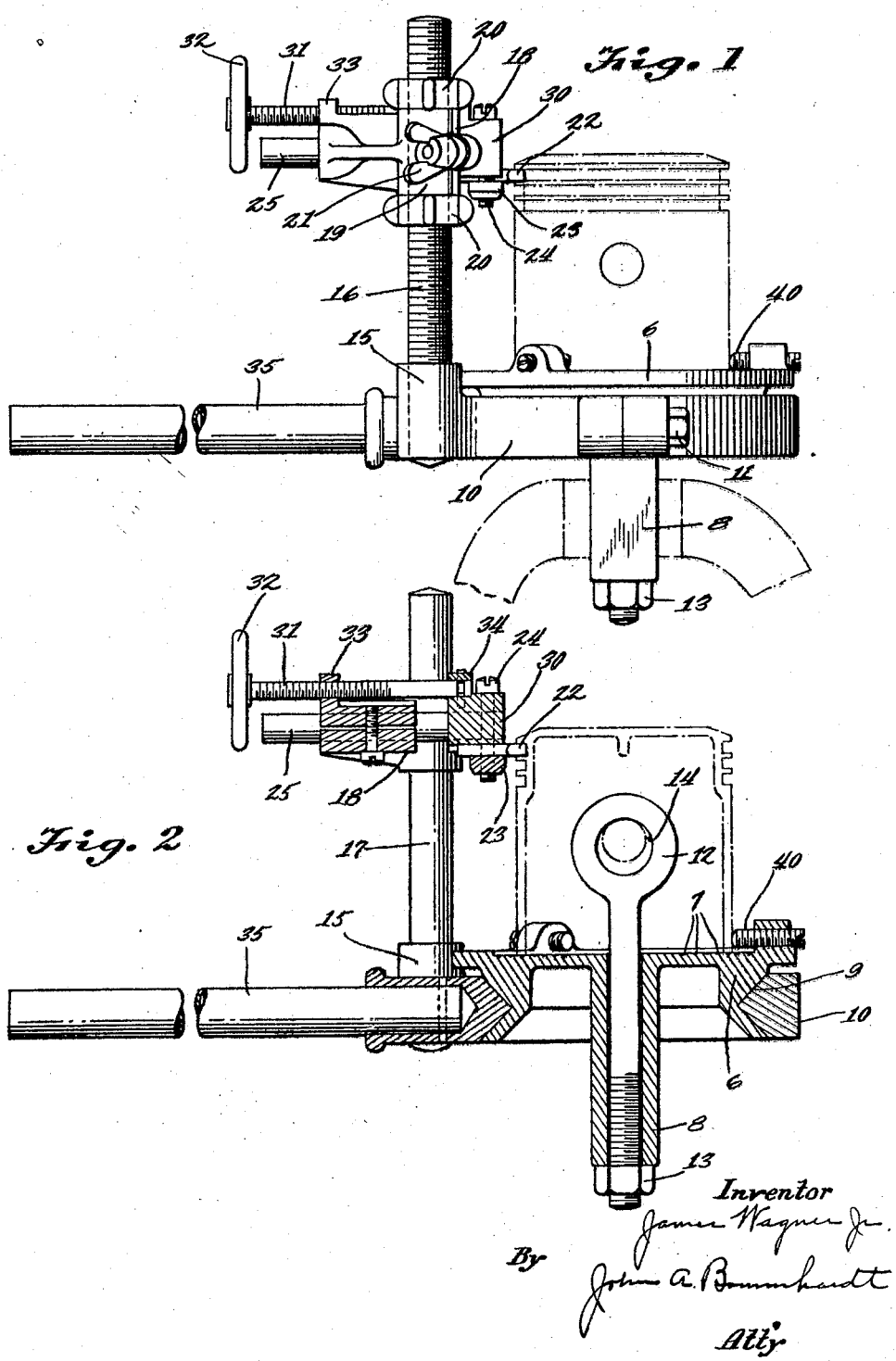

Inventor
James Wagner Jr
By John A. Bommhardt
Att'y

Patented Nov. 18, 1924.

1,515,636

UNITED STATES PATENT OFFICE.

JAMES WAGNER, JR., OF CLEVELAND, OHIO.

METAL-CUTTING TOOL.

Application filed May 2, 1923. Serial No. 636,182.

*To all whom it may concern:*

Be it known that I, JAMES WAGNER, Jr., a citizen of the United States, residing at Cleveland, in the county of Cuyahoga and State of Ohio, have invented certain new and useful Improvements in Metal-Cutting Tools, of which the following is a specification.

This invention relates to tools especially adapted and intended for cutting or enlarging grooves in pistons for the purpose of receiving piston rings, and in some respects is an improvement on the tool shown and described in my U. S. Patent No. 1430604 dated October 3, 1922.

The purpose of the present invention is to provide improved means for locating and holding a piston in position to be grooved; for locating and rotating the tool which cuts the grooves; and for generally improving the construction of such a tool as will be more fully apparent from the following description and the accompanying drawings.

Figures 3, 5:
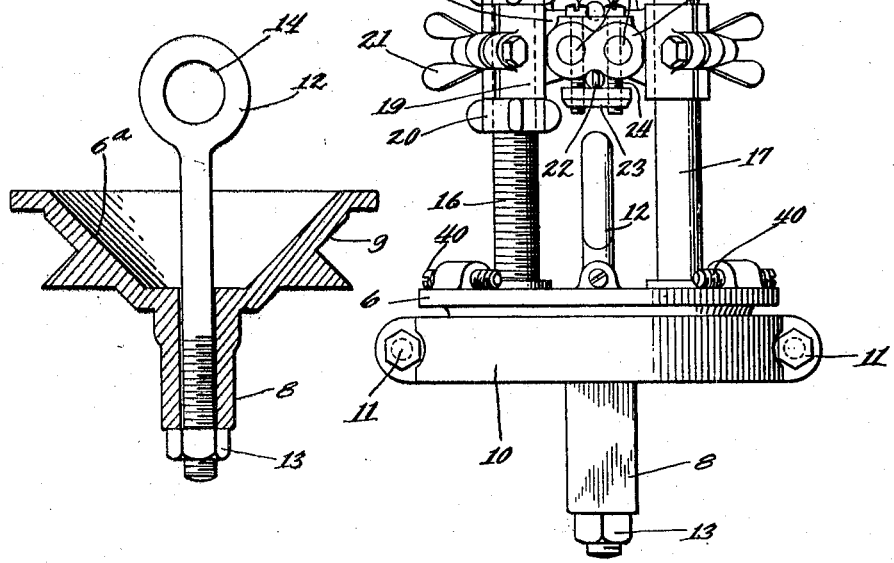
Figure 4:
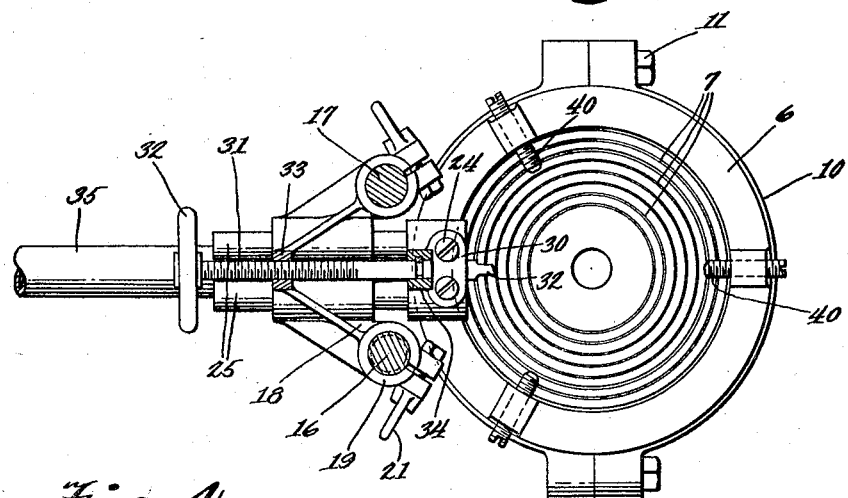

In the drawings, Fig. 1 is a side elevation of the tool. Fig. 2 is a vertical section thereof. Fig. 3 is an elevation at a right angle to Fig. 1. Fig. 4 is a horizontal section. Fig. 5 is a detail in section of a modification.

Referring specifically to the drawings, 6 indicates a base having grooves 7 adapted to position pistons of different sizes, the lower edge of the piston being matched with a groove whereby the piston is centered. Instead of the grooves, the base may be conical inside, as indicated at 6ª in Fig. 5, and the piston can be fitted in this conical seat so as to center the same. This base has a depending squared lug 8 which can be gripped in a vise or the like to hold a tool; or it can be fitted in a socket on a bench. Externally, the base has a V-groove 9 in which fits a ring 10 so that the ring will turn on the base. The ring is preferably made in halves connected by bolts 11 at opposite sides, so that it can be assembled, and adjusted to make the bearing as loose as necessary to permit the ring to turn. The base has a central bore extending vertically through the same to receive an eye bolt 12 with a nut 13 below the lug, and a pin can be passed through the eye 14 of the bolt and through the wrist pin bearings of the piston, and by tightening the nut 13, the piston is clamped and held in fixed position on the base.
The ring 10 has at one side a pair of lugs 15 on one of which is mounted a screw 16 and on the other of which is mounted a post 17. A yoke or holder 18 is slidable up and down on the post 17 and has a split sleeve 19 which embraces the screw 16, and the screw receives nuts 20 above and below the sleeve. By loosening these nuts, the holder or yoke can be slid up or down, and when in position, the nuts are tightened against the top and bottom of the sleeve, and the sleeve can also be tightened on the screw by the thumb screw 21, thereby clamping the yoke in exact and rigid position to agree with the groove to be cut.

The cutting tool is indicated at 22, and is clamped against a V-seat on the under side of a tool holder 30 by a plate 23 and clamping screws 24, the tool holder being slidable radially on guide rods 25 which are mounted in the yoke, the tool holder being adjusted on the guide rods by a screw 31 and hand wheel 32 carried in a lug 33 on the yoke and engaging a lug 34 on the tool holder.

A handle 35 is secured to, or may be inserted in a hole in, the ring 10 whereby the latter may be turned, and radial screws 40, mounted in lugs on the base 6 may be tightened against the piston to hold the latter.

In use, the piston is set and centered on the base and clamped by tightening the eye bolt and setting up the screws 40. Then the yoke is adjusted up or down, in the manner above described, to register the tool 22 with the groove to be cut. Then by turning the hand wheel 32, the tool holder is advanced until the tool is in the groove or against the work. Then by turning the ring 10 by means of the handle 35, the tool and its supporting posts are carried around the piston to cut the groove, the tool being fed in as fast as necessary by operating the screw 31. After one groove is cut, the tool is backed off by the screw, the yoke is raised or lowered to the next groove by loosening the thumb screws 21 and the nuts 20, and the parts are re-set for the next operation.

By the means described, pistons of various sizes can be worked out, and by changing the cutting tool, grooves of various sizes can be cut. The piston can be removed by loosening the eye bolt and backing off the set screw 40. The tool will be found very useful in automobile repair shops, or wherever it may be necessary to cut grooves in circular articles.

I claim:

1. A tool of the kind described, comprising a circular base having a central hole, a clamping device extending through the hole and adapted to engage the article, and a tool carrier rotatably mounted on the base.

2. A tool of the kind described comprising a base having a central hole through the same, a bolt extending through the hole and adapted to engage an article on the base, and a tool carrier mounted on and revoluble around the base.

3. A tool of the kind described having a circular base provided with means to clamp an article thereon, a ring revoluble around the base, a pair of uprights projecting from the ring and above the base, a yoke adjustable up and down on the uprights, and a tool holder movable radially on the yoke, the ring, uprights, yoke, and tool holder being revoluble around an article supported on the base.

4. A tool of the kind described having a circular base provided with means to clamp an article thereon, a ring revoluble around the base, a pair of uprights projecting from the ring and above the base, a yoke adjustable up and down on the uprights, and a tool holder movable radially on the yoke, the ring, uprights, yoke, and tool holder being revoluble around an article supported on the base, one of the uprights being threaded, and the yoke having a split sleeve embracing the threaded upright, and nuts on the threaded upright adjustable to clamp the sleeve in a selected vertical position.

In testimony whereof, I affix my signature in presence of two witnesses.

JAMES WAGNER, Jr.

Witnesses:
 JOHN A. BOMMHARDT,
 BESSIE F. POLLAK.